United States Patent
Patel et al.

(10) Patent No.: US 7,129,652 B2
(45) Date of Patent: Oct. 31, 2006

(54) SYSTEM AND METHOD FOR DRIVING A PLURALITY OF LOADS

(75) Inventors: Sanmukh Makan Patel, Richardson, TX (US); Zbigniew Jan Lata, Plano, TX (US); Ross Teggatz, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 204 days.

(21) Appl. No.: 10/810,943

(22) Filed: Mar. 26, 2004

(65) Prior Publication Data

US 2005/0212459 A1    Sep. 29, 2005

(51) Int. Cl.
*H05B 37/00* (2006.01)

(52) U.S. Cl. .................. 315/291; 315/363
(58) Field of Classification Search ............. None
See application file for complete search history.

(56) References Cited

U.S. PATENT DOCUMENTS

| | | | |
|---|---|---|---|
| 4,347,540 A * | 8/1982 | Gary et al. | 361/47 |
| 5,742,133 A | 4/1998 | Wilhelm et al. | |
| 5,789,766 A | 8/1998 | Huang et al. | |
| 5,812,105 A * | 9/1998 | Van de Ven | 345/83 |
| 6,144,222 A | 11/2000 | Ho | |
| 6,359,392 B1 | 3/2002 | He | |
| 6,586,890 B1 | 7/2003 | Min et al. | |
| 6,628,252 B1 | 9/2003 | Hoshino et al. | |
| 6,690,146 B1 | 2/2004 | Burgyan et al. | |

* cited by examiner

*Primary Examiner*—David Vu
(74) *Attorney, Agent, or Firm*—William B Kempler; W. James Brady; Frederick J. Telecky, Jr.

(57) ABSTRACT

A system for controlling a plurality of load devices includes a high-side system operative to source current relative to at least two associated outputs. A low-side system is operative to sink current relative to a plurality of associated inputs. A control system controls the high-side system and the low-side system according to a multiplexing scheme that is operative to provide current to selected load devices of the plurality of load devices connected between the associated outputs and the associated inputs. The system can be implemented as an integrated circuit for driving the plurality of loads, which can include LED's.

32 Claims, 5 Drawing Sheets

SYSTEM AND METHOD FOR DRIVING A PLURALITY OF LOADS

TECHNICAL FIELD

The present invention is directed generally to integrated circuits and, more particularly, to systems and methods for driving a plurality of loads.

BACKGROUND

Various types and configurations of driver circuitry have been developed for driving different load devices. For example, driver circuits have been designed to drive light emitting diodes (LED's). LED's provide a unique type of load, as illumination provided by an LED is proportional to the current through the device. In certain applications (e.g., the automotive industry, consumer electronics, etc.), a constant intensity of illumination may be desirable. Hence, efforts have been made to design LED drivers that provide a controllable amount of current to LED's to achieve a desired intensity of illumination. These designs, however, typically have not been completely satisfactory. For example, complex and/or expensive circuitry is generally required to provide a desirable level of control over the amount of illumination or to enable driving different color LED's. Accordingly, a more cost efficient and versatile solution is desirable.

SUMMARY

The present invention relates generally to systems and methods for driving a plurality of loads, such as including a plurality of light emitting diodes (LED's).

One aspect of the present invention provides a system for controlling a plurality of load devices. The system includes a high-side system operative to source current relative to at least two associated outputs. A low-side switching is operative to sink current relative to a plurality of associated inputs. A control system controls the high-side system and the low-side system according to a multiplexing scheme that is operative to provide current to selected load devices of the plurality of load devices connected between the associated outputs and the associated inputs. The system can be implemented as an integrated circuit for driving the plurality of loads, which can include LED's. In such a system, for example, the switching systems (e.g., implemented as transistor networks) can cooperate to provide a substantially regulated average current to operate selected LED's at a switching frequency that provides a desired intensity of illumination of the LED's.

Another aspect of the present invention provides a light emitting diode system that includes a driver system. The driver system includes a set of high-side switch devices and a set of low-side switch devices. A control system controls operation of selected switch devices in the set of high-side switch devices and the set of low-side switch devices each cycle according to a multiplexing scheme. The multiplexing scheme can vary according to the number of high-side switch devices. The system also includes a plurality of LED's arranged in at least two sets of LED's. Each of at least two of the high-side switch devices is coupled to drive LED's in an associated one of the at least two sets of the LED's, and the low-side switch devices are coupled to sink current from the LED's in each of the at least two sets of LED's. A selected subset of at least some of the LED's can be selectively operated for illumination at a switching frequency based on operation of the selected high-side and low-side switch devices by the control system.

BRIEF DESCRIPTION OF THE DRAWINGS

The foregoing and other aspects of the present invention will become apparent to those skilled in the art to which the present invention relates upon reading the following description with reference to the accompanying drawings.

DETAILED DESCRIPTION

The present invention relates to systems and methods for driving a plurality of loads. For purposes of simplicity of explanation, and not by way of limitation, the loads are described herein as being LED's. The approach described herein enables fewer components to be utilized for driving the LED's compared to many existing approaches. As a result, a cost efficient and versatile driver system can be provided.

Figure 1:
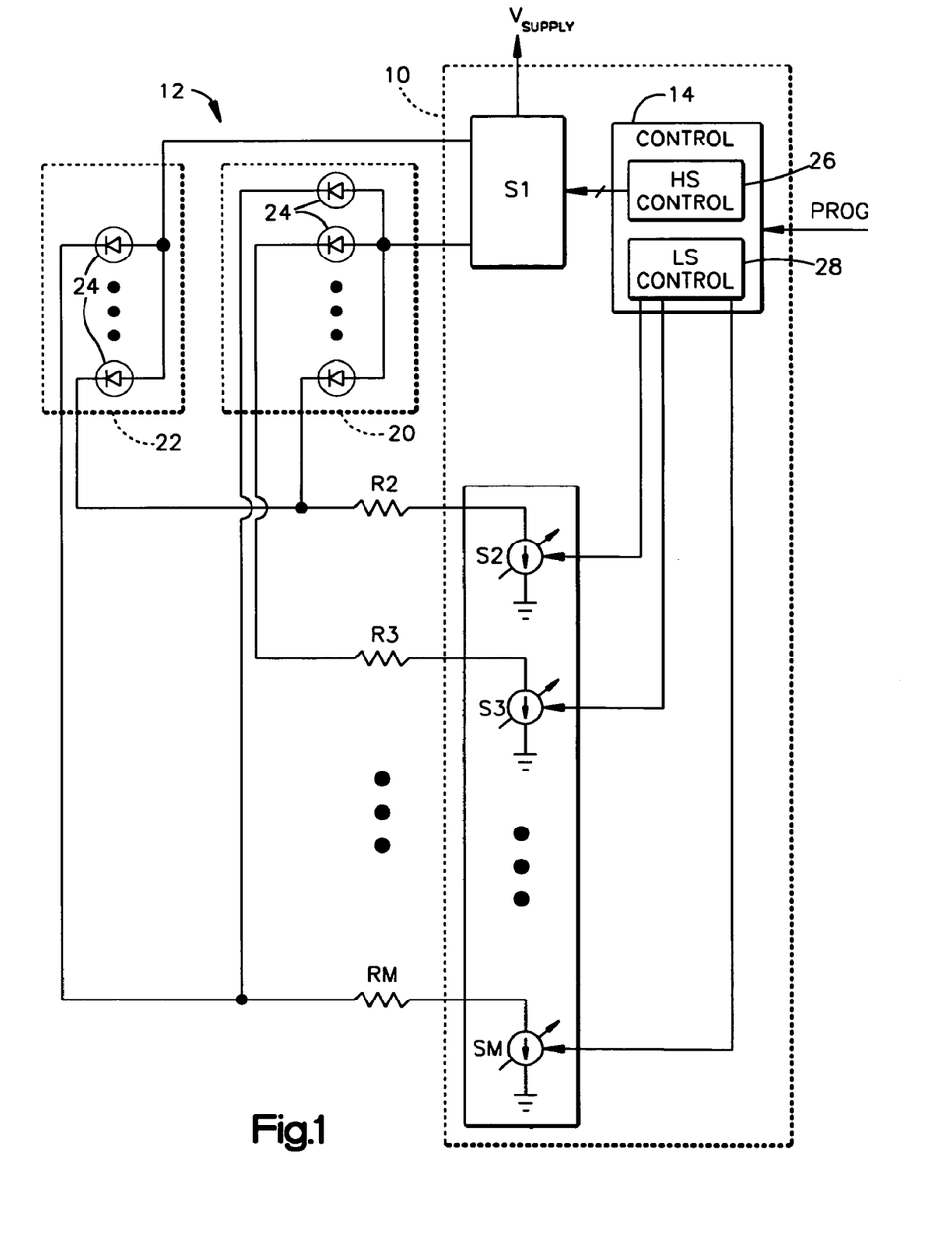
FIG. 1 is a block diagram illustrating a system for driving loads in accordance with an aspect of the present invention.

FIG. 1 depicts an example of a driver system 10 that is operative to drive one or more associated load devices 12 according to an aspect of the present invention. The driver system 10 includes a control system 14 that is coupled to control energization of the associated load devices 12.

The driver system 10 also includes a high-side (HS) system, indicated at S1, which is coupled to a supply voltage $V_{SUPPLY}$. S1 can be implemented as an arrangement of transistors or other types of one or more switch devices that can be controlled for providing power to the load devices 12. The supply voltage $V_{SUPPLY}$, for example, can be provided by a battery or other voltage source. The control system 14 controls S1 for sourcing current relative to the associated load devices 12. The control system 14 also is operative to control a low-side (LS) system, which can comprise a set of one or more LS variable current sources such as switch devices, indicated at S2, S3 and SM, where M is a positive integer denoting the number of LS devices. As used herein, a switch device can be considered any arrangement of one or more transistors or other components that can be operated as a logical switch (e.g., having ON and OFF conditions) and/or can be operated as a variable current source (e.g., providing current functionally related to a bias voltage) to provide a desired amount of current.

According to an aspect of the present invention, the control system 14 controls the set of HS switch devices S1 and the set of low-side switch devices S2-SM according to a multiplexing scheme. For instance, selected ones of S2-SM can be activated commensurate with corresponding activation of the HS devices S1 to provide substantially regulated average current to selected ones of the plurality of load devices 12. The control system 14 can employ the multiplexing scheme for energizing different ones of the load devices 12 each cycle. The multiplexing scheme can be programmable, which can vary according to the number of load devices 12 and the desired operation thereof.

Any number of load devices 12 can be coupled externally to the driver system 10. One or more sets of load devices, indicated at 20 and 22, can be associated with each of the HS switch devices, such that selected ones of the load devices can be selectively energized during activation of a respective one of the HS switch devices in the switching sequence. The selective activation of each of the load devices can be independently controlled during each activation phase of each cycle based on corresponding control of S2-SM relative to the set of load devices (20, 22) being energized by S1.

In the example of FIG. 1, two sets of load devices 20 and 22 are shown connected in parallel and coupled to S1, although other numbers of sets can be implemented in connection with the driver system 10. Each set of load devices 20 and 22 can include one or more channels that may be independently controlled by the driver system 10. According to an aspect of the present invention, the number of channels can correspond to the product of the number of HS devices and the number of LS devices. Each channel can include a load, such as a LED 24, which can be independently energized based on the state of the multiplexing scheme associated with the HS and LS switching devices.

Each LED 24 is also coupled to a respective one of the LS devices S2-SM through a corresponding current limiting resistor, indicated at R2-RM. The resistance of each resistor R2-RM can be selected to provide a desired average current according to the illumination requirements of the respective LED's 24. For example, the external resistors R2-RM can be configured so that the desired average current is achieved for the respective LED's. For example, if the LED's have the same illumination requirements, the same resistance can be utilized for each LS input. Alternatively, if different color LED's having different illumination requirements are being utilized, different resistors can be selected to optimize their operation accordingly. It will be understood and appreciated that the number of LED's 24 that can be illuminated simultaneously during activation of a given one of the HS switch devices can vary depending on, for example, the supply voltage $V_{SUPPLY}$, illumination intensity requirements and associated current required to illuminate the respective LED's.

In the example of FIG. 1, the control system 14 includes a HS control 26 for controlling the HS system (S1) and a LS control 28 for controlling the LS system (S2-SM). The HS control 26 and LS control 28 cooperate for sequencing the respective HS and LS devices to provide a substantially regulated average current to the load devices 12 being energized during each phase of a switching cycle.

According to one aspect of the present invention, the HS control 26 and LS control 28 operate respective devices to regulate the average (e.g., root mean square (RMS)) current delivered to each of the LED's of the external load 12 every cycle. As an example, the HS and LS controls 26 and 28 can employ a multiplexing scheme to sequence at least two switch devices of the set of HS devices during each cycle energize each set of load devices 20 and 22 in a sequence accordingly. The LS control 18 activates one or more of the LS devices S2-SM for selectively energizing corresponding LED's 24 in the energized set of load devices 20 or 22 during the appropriate part of the HS switching sequence. In this way, a desired average RMS current can be provided to the respective LED's associated with the LS devices. The HS control 26 and the LS control 28 can also implement desired current control via operation of the respective HS and LS devices.

For example, the LS control 18 operates the LS switch S2-SM at a duty cycle that is functionally related (e.g., inversely proportional) to the number of HS switch devices being multiplexed in sequence during each cycle. By substantially regulating the average RMS current for each of the LED's 24 during each cycle and by providing a switching frequency that is less than about 500 Hz and greater than about 50 Hz (e.g., in a range from about 60 to about 300 Hz), a desired intensity of illumination can be maintained for the LED's. The result is visibly apparent steady illumination of the selected LED's.

The particular switching sequence and duty cycle of the HS and LS devices can be programmable, such as based on a PROG input signal provided to the control system 14. The PROG input signal can be provided by, for example, a microcontroller or other associated device configured to program the driver system 10. By way of further example, one or both of the HS control 16 and LS control 18 can implement a pulse width modulation (PWM) scheme to selectively control a combination of the HS switch devices and LS switch devices, such as for dimming the intensity of illumination for the LED's 24. The PWM scheme can be provided via the PROG input or, alternatively, it can be internally produced by the control system 14. The HS control 26 and the LS control 28 can also implement desired current control of the respective HS and LS devices to control current through the LED's for implementing a desired intensity of illumination. For example, current mode control can be implemented with respect to the LS devices S2-SM to provide a substantially regulated average RMS current in each activation phase, even as $V_{SUPPLY}$ might vary.

Those skilled in the art will understand and appreciate that various combinations of different numbers of HS and LS devices (S1-SM) can be implemented for driving various numbers of load devices 12. Additionally various combinations of PWM and current control also can be employed to provide desired current selectively to the load devices 12. The approach described herein enables a reduced number of switch devices relative to many existing approaches.

The arrangement depicted in FIG. 1 is scalable, such as by employing a different multiplexing scheme according to the number and configuration of LED's being driven. Generally, the driver system 10 can drive up to a number of (M+1)*N LED's 24, where N is a positive integer denoting the number of HS switch devices and (M+1) corresponds to the number of LS devices S2-SM. Typically, M<N. The maximum number of HS devices N will vary depending on, for example, the types of load devices and the required current that the HS devices for satisfactory illumination of the LED's.

Those skilled in the art will understand and appreciate that the number of high-side devices could vary according to the available power from $V_{SUPPLY}$, the switching frequency and cycle time, and the duty cycle at which the HS and LS devices are activated to their respective ON conditions for energizing the load 12.

Figure 2:
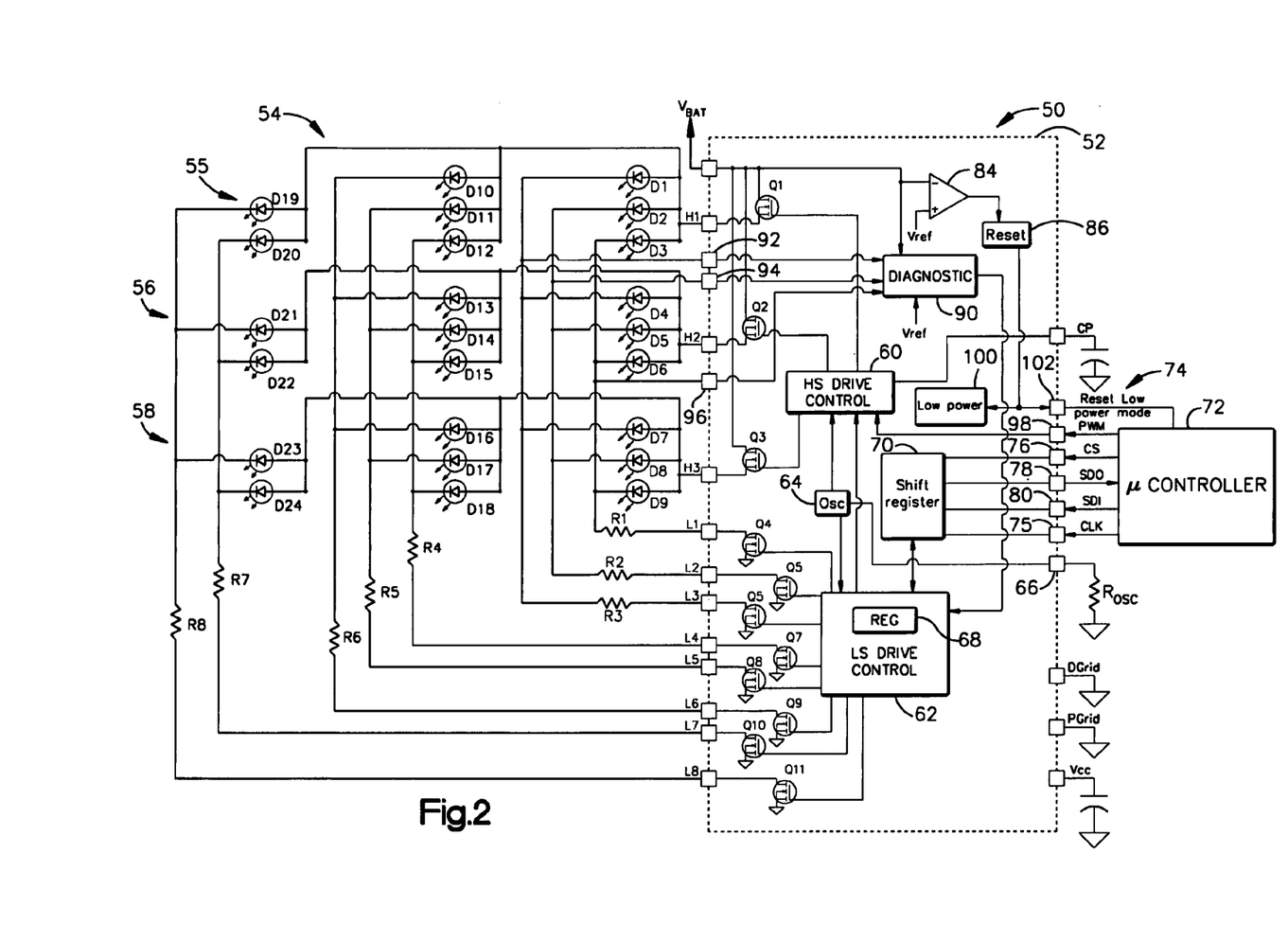
FIG. 2 is a circuit diagram of a driver system implemented in combination with a multi-channel load system in accordance with an aspect of the present invention.

FIG. 2 depicts an example of a schematic block diagram of a system 50 that can be implemented in accordance with an aspect of the present invention. The system 50 includes a driver system 52, such as can be implemented as an integrated circuit chip (e.g., an application specific integrated circuit (ASIC)). The driver system 52 employs a combination of high-side switch devices (e.g., n-type MOSFET devices), indicated at Q1, Q2 and Q3, and a plurality of low-side switch devices (e.g., also MOSFET devices), indicated at Q4, Q5, Q6, Q7, Q8, Q9, Q10 and Q11 to control energization of a plurality of load devices 54. Each of the HS devices Q1–Q3 is coupled to source current to the load devices 54 via a respective output H1–H3. Each of the LS devices Q4–Q11 is coupled to sink current from the load devices to electrical ground 54 via a respective input L1–L8. Those skilled in the art will understand that a corresponding driver system 52 can be implemented using various types of switch devices or transistors based on the teachings contained herein.

In the system 50, the load devices 54 can be implemented as an array of LED's, indicated at D1–D24. Each of the LED's D1–D24 can correspond to an independently controllable channel according to operation of the HS and LS switch devices Q1–Q11. The LED's D1–D24 are respectively coupled between the output terminals H1–H3 of the respective high-side switch devices Q1–Q3 and the input terminals L1–L8 associated with the low-side switch devices in series with respective current limiting resistors indicated at R4–R11. In the LED array of FIG. 2, each current limiting resistor R1–R8 is operatively coupled with a given low-side switch device Q4–Q11 and with a set of LED's, each of which is coupled to a different one of the output terminals H1–H3.

In FIG. 2, a set (or string) of LED's, indicated at 55, 56 and 58, is operatively coupled to be energized by each respective HS output H1, H2 and H3. In particular, LED set 55 includes LED's D1, D2, D3, D10, D11, D12, D19 and D20. LED set 56 includes D4, D5, D6, D13, D14, D15, D21 and D22. LED set 58 includes D7, D8, D9, D16, D17, D18, D23 and D24. While each of the LED sets includes the same number of LED's, those skilled in the art will understand and appreciate that different numbers of LED's can be driven by each of the respective HS outputs.

As a result of such configuration, each of the LED's D1 D-24 is independently controllable based on the switching sequence of the respective HS and LS switch devices implemented each cycle. For instance, the HS and LS switch devices Q1–Q11 can be controlled in a sequence and with a duty cycle to maintain a desired average (RMS) current through the load 54 every cycle. By maintaining the desired average RMS current to the load 54, a desired intensity of illumination can be provided for the LED's D1–D24. The average RMS current further can vary from cycle to cycle or for different phases of the same cycle by controlling operation of the HS and LS switch devices Q1–Q11.

In order to control the high-side transistors Q1–Q3, the drive system 52 includes a HS control system 60 having outputs coupled to the gates of Q1–Q3. Similarly, a LS control system 62 is coupled to provide output signals to the respective gates of each of Q4–Q11. Each of the LS switch devices Q4–Q11 is configured to sink load current to electrical ground when activated. The LS gate control signals are sequenced and synchronized for activation relative to corresponding activation of HS switch devices Q1–Q3 for providing a substantially regulated average RMS current to selected LED's D1–D24 each cycle. The average RMS current is controlled each cycle to provide a desired intensity of illumination for the selected LED's. The LS control system 62 further operates to control the rise and fall times associated with the respective switch devices Q4–Q11, such as to mitigate electromagnetic interference associated with operation of the system 50.

An internal oscillator 64 is coupled to provide internal clocking controls to the HS control system 60 and to the LS control system 62. As an example, the oscillator 64 can provide a square wave at a frequency in a range from 60 Hz to about 300 Hz at a 50% duty cycle. The square wave can be utilized as an internal clock signal to synchronize the respective gate control systems 60 and 62 and establish the cycle time for operation of the system 50. The frequency of the oscillator 64 can be programmed, for example, by an external resistor $R_{osc}$ coupled to an external pin 66 of the driver system 52. The oscillator 64 thus affords a programmable cycle time (e.g., about 20 ms) employed for synchronizing the switching sequences of the LS and HS switch devices Q1–Q11. With the respective HS and LS switch devices being synchronized via the oscillator 64, a blanking time delay can implemented by the LS control system 62 to mitigate diode capacitance discharge of the other lines in the system during operation.

The driver system 52 also includes one or more registers 68 for configuring operation and setting control parameters of the driver system 52. In the example of FIG. 2, the registers 68 are illustrated as being part of the LS control system 62. Those skilled in the art will understand and appreciate that such registers 68 alternatively could be implemented separately from the LS control system 62. The driver system 52 also includes a shift register 70 to facilitate programming the registers 68 with desired configuration data. The shift register 70 is operative to latch input and output information to and from the driver-system 52.

In the example of FIG. 2, the shift register 70 is coupled to a microcontroller 72 through a bus 74 that provides for communication between the shift register 70 and the microcontroller 72. In the example of FIG. 2, the bus 74 provides for a clock signal (CLK) to be transmitted via terminal 75 from an external source, such as the microcontroller 72, for synchronizing communication of data between the microcontroller and the driver system 52. For instance, the CLK signal can be provided as a square wave having a frequency in the range from about 1 MHz to about 10 MHz. The CLK signal thus provides for latching data from the microcontroller 72 to the shift register 70 as well as for latching output data to the microcontroller.

The bus 74 also includes a chip select (CS) line associated with a terminal 76. The CS line has a state (e.g., 0 or 1) that enables communication between the driver system 52 and the associated microcontroller 72 or other device that may be coupled thereto via the bus 74. Output data is communicated from the driver system 52 via terminal 78, such as corresponding to a master output signal. Similarly, input data from the microcontroller or other device can be provided to the shift register 70 via input terminal 80, such as a corresponding slave input line. The data being shifted into and out of the driver system 52 can be communicated from the shift register 70 to one or more of the registers 68. Alternatively, a plurality of separate registers can be provided in the driver system 52.

The registers 68 can be utilized to store various programming configuration information for controlling the switch devices Q1–Q11. By way of further example, the registers 68 can include LED control registers that set a combination of high-side switch devices Q1–Q3 and low-side switch devices Q4–Q11 that are to be activated each cycle for illuminating selected ones of the LED's D1–D24. For instance, a selected set of one or more low-side switch devices Q4–Q11 can be activated to the ON condition during the corresponding ON period associated with each respective high-side switch devices Q1–Q3. The particular number of low-side switch devices that can be activated to the ON condition during a corresponding ON period of a given one of the high-side devices generally will depend on the available average RMS current that can be delivered during each cycle as well as the load requirements.

A selected plurality of LED's can be driven simultaneously through activation of a given one of the HS switch devices Q1–Q3 and selected LS switch devices Q4–Q11. For the arrangement of LED's D1–D24 in FIG. 2, for example, up to eight LED's (e.g., LED sets 55, 56 and 58) can be driven in parallel simultaneously during a corresponding ON period for one of the respective high switch devices Q1–Q3. Table 1 depicts an example of sequencing that can be employed to activate each of the respective LED's D1–D24 in FIG. 2.

TABLE 1

| LED | HS FET | LS FET |
|-----|--------|--------|
| D1  | Q1     | Q6     |
| D2  | Q1     | Q5     |
| D3  | Q1     | Q4     |
| D4  | Q2     | Q6     |
| D5  | Q2     | Q5     |
| D6  | Q2     | Q4     |
| D7  | Q3     | Q6     |
| D8  | Q3     | Q5     |
| D9  | Q3     | Q4     |
| D10 | Q1     | Q9     |
| D11 | Q1     | Q8     |
| D12 | Q1     | Q7     |
| D13 | Q2     | Q9     |
| D14 | Q2     | Q8     |
| D15 | Q2     | Q7     |
| D16 | Q3     | Q9     |
| D17 | Q3     | Q8     |
| D18 | Q3     | Q7     |
| D19 | Q1     | Q11    |
| D20 | Q1     | Q10    |
| D21 | Q2     | Q11    |
| D22 | Q2     | Q10    |
| D23 | Q3     | Q11    |
| D24 | Q3     | Q10    |

From Table 1 and the configuration shown in FIG. 2, it will be appreciated that for activation of each HS device Q1–Q3, any number of associated LED's can be driven based on corresponding activation of selected LS switch devices Q4–Q11. As described herein, the intensity of illumination can be controlled based on the duty cycle at which the LS switch devices are activated and the external current limiting resistors R1–R8 coupled to the respective LED's.

The registers 68 further can include a configuration register in the registers 68 that defines a particular multiplexing scheme to be implemented relative to the available HS switch devices Q1–Q3. For example, the driver system 52 in FIG. 2 can be configured to operate with a 1:3 multiplexing scheme in which Q1–Q3 are enabled for switching in a predetermined sequence each cycle. As an alternative, the system 52 can be programmed by setting the configuration register of the registers 68 to operate with the 1:2 multiplexing scheme, such that Q3 is disabled from the switching sequence each cycle. The different multiplexing schemes thus afford scalability for illuminating differently sized LED arrays. The 1:2 multiplexing scheme can be employed, for example, when a greater amount of current is required, as the duty cycle can be increased to up to a 50% duty cycle. Alternatively, the 1:2 multiplexing scheme can be implemented if there are fewer LED's (e.g., less than or equal to 16 LED's).

The switching frequency of the respective high-side switch devices can also be programmed or adjusted via the configuration register. For instance, the switching frequency can be set to a switching frequency that is pre-scaled as a function of the internal master clocking signals generated by the oscillator 64, such as less than 500 Hz (e.g., in a range from about 60 Hz to about 300 Hz).

The configuration register of the registers 68 can also be utilized to set various optional operating modes that can be implemented by the driver system 52. For example, duty cycle compensation can be enabled to adjust the duty cycle for the LS switch devices Q4–Q11 as a function of the battery voltage $V_{BAT}$ that is provided as an unregulated input to the driver system 52. The duty cycle compensation can be enabled or disabled based on configuration data (e.g., provided by the microcontroller 72).

The driver system 52 can also include a diagnostic module 90 that is coupled to one or more diagnostic sense inputs 92, 94 and 96. The diagnostic module 90 is operative to detect a protection condition associated with operation of the system 50. For example, the diagnostic module can monitor for open load conditions during the OFF states of the respective high-side switch devices Q1–Q3 and to diagnose for shorted loads during the ON conditions thereof. In the example of FIG. 2, the diagnostic sense. inputs 92–96 are operative to monitor for fault diagnostics during the ON phase of each respective high-side switch device Q1–Q3. Thus, in this example, since three channels are associated with each of the sense inputs 92–96, the diagnostic module 90 is operative to diagnose up to a total of nine different channels of the system 50.

Those skilled in the art will understand various other types of protection conditions that can be monitored by the diagnostic module 90. For example, the diagnostic module 90 can be coupled to monitor operation of the high side switch devices Q1–Q3, including short circuit conditions to ground, open circuit conditions transient voltage or current conditions, and the like. Similar detection can also be implemented with respect to the low side switch devices Q4–Q11 (e.g., open circuit conditions, short circuit conditions, transients and the like). Thus, those skilled in the art will understand that various types of protection schemes can also be implemented based on the protection conditions detected by the diagnostic module 90. Such protection can be implemented by external circuitry, such as the microcontroller 72, and/or internally by appropriate protection mechanisms built in to the driver system 52.

By way of example, if the input battery voltage $V_{BAT}$ exceeds an over voltage threshold, the driver system 52 can disable its associated outputs. The outputs can be allowed to turn back on after the voltage $V_{BAT}$ has been reduced to within specified limits, and the reset/low power mode signal has been released. The under voltage and over voltage lockout functions can be utilized to protect the diodes that may be coupled to the driver system, such as during a situation when proper duty cycle can not be implemented by the driver system 52.

The diagnostic module 90 provides corresponding outputs to the LS control system 62 for setting appropriate diagnostic registers in the register block 68. The information in the diagnostic registers can be provided to the microcontroller 72 or other output device via the data output terminal 78 of the bus 74. A similar thermal shutdown function can also be enabled and disabled, such as by setting a corresponding register value.

Additionally, under and over voltage lockout functions can be selectively enabled and disabled, such as by programming appropriate register entries in the registers 68. By enabling the voltage lockout functions, the driver system 52 can implement desired system shutdown, such as in the event that the battery voltage $V_{BAT}$ falls below a threshold. To monitor the battery voltage $V_{BAT}$, the driver system 52 can include a comparator 84 that compares the battery voltage $V_{BAT}$ relative to a reference voltage VREF. The comparator 84 provides a corresponding output signal to a reset block 86. The reset block 86 is coupled to a low power mode control component 100.

The low power mode control component 100 also receives a low power input signal from the microcontroller 72 via a terminal 102. If the input to the low power component 100 is pulled low, either through the reset block 86 or via the low power mode input signal from the microcontroller 72, the driver system 52 can disable is outputs so that current consumption of the driver system 52 is very low (e.g., in the microamp range). The terminal 102 is bidirectional in that it can allow a signal from external sources, such as the microcontroller disable the outputs as well as internal fault detection can pull the terminal low to implement suitable fault protection.

The driver system 52 can implement dimming of the intensity for associated LED's D1–D24 in a variety of different ways. As mentioned above, configuration registers in the registers 68 can be programmed to set the duty cycle of the HS and LS switch devices to provide a desired intensity of illumination for the respective LEDs D1–D24. For example, there can be a set of predetermined dimming control configurations that can be implemented based on the value programmed into a dimming configuration register.

Alternatively or additionally, software control can be implemented, such as by the microcontroller 72, to implement the dimming function. As an example, the microcontroller 72 or other external (or internal) circuitry can be configured to dynamically adjust the average current sourced by the respective high-side device Q1–Q3 during a corresponding ON period thereof, such as dynamic compensation based on the $V_{BAT}$ signal. As mentioned above, the $V_{BAT}$ signal corresponds to an unregulated input supply voltage that is monitored by the driver system 52.

By way of further example, the battery voltage can vary, such as in the range from about 5V to about 40V. Due the possible range of the $V_{BAT}$, the internal duty cycle can be adjusted to implement a coarse level of compensation as a function of $V_{BAT}$. Additional, finer adjustments can be made to the duty cycle by the microcontroller 72, such as through a PWM input control that can be provided to input 98. Dimming implemented by the microcontroller 72 or other external control circuitry via the PWM input 98 can be provided to override or to supplement existing dimming control being implemented internally by the driver system 52.

In yet another implementation, the LS switch devices Q4–Q11 can be selectively controlled to further control the current through the LED's. For example, the LS control system 62 can be configured to implement current control by controlling the gate voltage of the respective LS switch devices Q4–Q11 to achieve desired current control. This mode of current control (e.g., by operating one or more of the LS switch devices Q4–Q11 in the triode region) can be implemented as an alternative or additionally to controlling the pulse width of the LS switch devices. Those skilled in the art will understand and appreciate various modes of current control and PWM control that can be implemented, according to an aspect of the present invention, based on the teachings herein. By implementing such current control relative to the LS switch devices (and/or the HS switch devices), a desired substantially regulated average current can be provided through each of the Q4–Q11 even as $V_{BAT}$ changes.

Registers 68 can also be utilized to store status information that can be provided to the microcontroller via the output line 78 of the bus 74. As an example, the status registers 68 can be set to identify an over voltage event or an under voltage event, to indicate a voltage $V_{BAT}$, as well as to indicate the occurrence of a thermal shutdown event.

Figure 3:
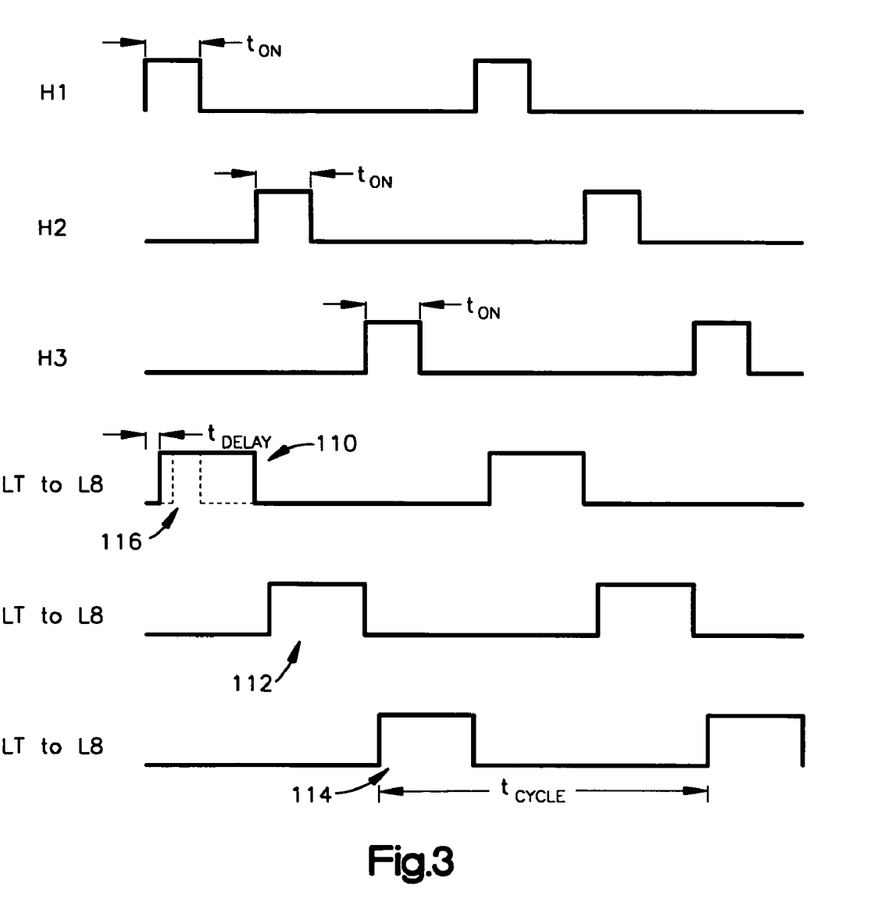
FIG. 3 is an example of a timing diagram depicting waveforms associated with the circuit of FIG. 2.

Operation of the system 50 of FIG. 2 will be better appreciated with respect to the timing diagram of FIG. 3. In FIG. 3, switching sequences are illustrated for each of the outputs H1–H3 associated with the respective HS switch devices Q1–Q3. Switching waveforms are also collectively for each of the inputs L1–L8 associated with the LS switch devices Q4–Q11. In the example of FIG. 3, it is assumed that each of the low-side switch devices Q4–Q11 (FIG. 2) is operated simultaneously for illuminating a maximum number of the LED's D1–D24 according to the multiplexing switching scheme being implemented. Those skilled in the art will understand and appreciate that any of the LED's D1–D24 can be selectively illuminated by controlling activation of selected low-side switch devices Q4–Q11 during corresponding operation of the HS switch devices Q1–Q3. The selective control, for example, can be controlled by programming the configuration registers described above.

As depicted in the example of FIG. 3, each of the HS outputs H1–H3 is energized (by activating Q1–Q3, respectively, to an ON condition) in a predetermined sequence for a time period indicated at ton during each cycle. After a predetermined delay time $t_{delay}$ from activation of H1, the low-side inputs L1–L8 are activated for a first phase of the cycle (indicated at 110) through operation of the switch devices Q4–Q11 of FIG. 2. While H1 and L1–L8 are activated simultaneously during the phase 110, corresponding LED's D1, D2, D3, D10, D11, D12, D19 and D20 (FIG. 2) are driven to provide desired illumination thereof. For example, a peak current of approximately 120 mA can be sourced from H1 for driving the respective LED's D1, D2, D3, D10, D11, D12, D19 and D20 during the activation phase 110. The activation phase 110 associated with L1–L8 provides a desired RMS current (e.g., 120 milliamps peak corresponds to about 40 milliamps RMS) sufficient to maintain illumination of the LED's to the human eye. After H1 is deactivated to an OFF condition, L1–L8 may remain in the ON condition to permit residual current to discharge.

After L1–L8 have been turned OFF (at the end of the activation phase 110), H2 is energized by Q2 being activated to an ON condition. H2 is energized for the time period to. After $t_{delay}$ has elapsed from when H2 is energized, L1–L8 are once gain activated to the ON condition for a second activation phase 112 of the cycle. Referring back to FIG. 2, the second activation phase 112 corresponds to driving LED's in the LED set 56, including D4, D5, D6, D13, D14, D15, D21 and D22 accordingly. Later in the cycle, H2 is deenergized, but L1–L8 remain in the ON condition to sink residual current from the LED's D4, D5, D6, D13, D14, D15, D21 and D22 to two electrical ground.

After the second activation phase 112 when L1–L8 are deactivated, H3 is energized, by activating Q3 to the ON condition for the next part of the sequence. H3, like H1 and H2, can be energized for ton. After the appropriate blanking time delay $t_{delay}$ has been implemented, L1–L8 are again activated for sinking current from corresponding LED set 58, which includes LED's D7, D8, D9, D16, D17, D18, D23 and D24, for a third activation phase 114 of the cycle. The LED's D7, D8, D9, D16, D17, D18, D23 and D24 can be illuminated at a desired intensity corresponding to the average RMS current sourced to the LED's D7, D8, D9, D16, D17, D18, D23 and D24 via H3. The activation phase 114 for L1–L8 remains after H3 is deenergized to sink residual current from the LED's being activated.

The foregoing multiplexing sequence can be repeated each cycle at a low switching frequency,. such as in the range from about 50 Hz to about 300 Hz, to illuminate the respective sets of LED's sequentially. In this way, the LED's will appear to remain illuminated at a desired intensity without visible dimming to the human eye. Of course, as described herein, dimming can be implemented with respect to the any of the LED's, such as to provide an indication of an event or condition determined by the microcontroller. As an example, the LS switch devices Q4–Q11 can be pulse-width-modulated, as indicated at 116, to decrease the average RMS current provided to the LED's during one or more of the activation phases 110, 112 and 114. Such PWM control can be implemented by the LS control system 62, such as based on configuration information provided by the microcontroller 72 of FIG. 2. Additionally or alternatively, current control can be implemented for each channel by controlling the gate voltage for operation in the triode region of the respective LS (MOSFET) devices Q4–Q11 of FIG. 2.

Those skilled in the art will further appreciate various combinations of PWM and/or current control can be implemented on the LS devices Q4–Q11, on the LS devices Q1–Q3 or on both the LS and HS devices. For example, while the waveforms of FIG. 3 depict each of L1–L8 being activated simultaneously in each activation phase, alternatively, one or more of L1–L8 could be activated independently in a sequence, such as during different selected portions of the respective activation phases each cycle. Such an approach would enable greater peak currents to be provided to the associated load devices (e.g., LED's). Additionally, with this approach, it might be necessary to increase the switching frequency accordingly to provide a sufficient average RMS current through the devices each cycle to maintain a desired intensity of illumination for the LED's.

Figure 4:
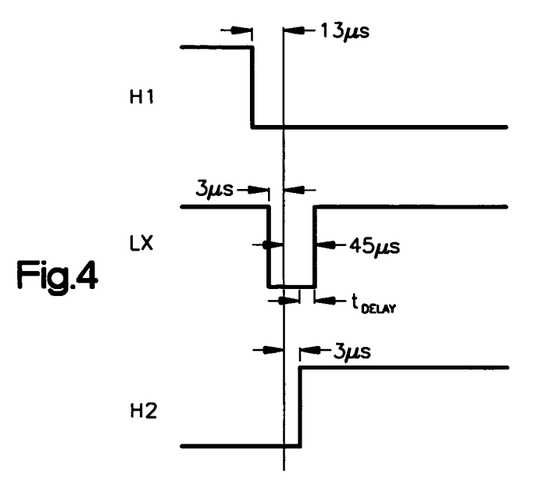
FIG. 4 is an example of a timing diagram depicting waveforms employing a blanking interval associated with the circuit in accordance with an aspect of the present invention.

FIG. 4 depicts an enlarged view of selected portions of the waveforms depicted in FIG. 3. In particular, FIG. 4 illustrates the switching sequence for a given LS switch device, coupled to an input indicated at LX, relative to switching at two HS outputs H1 and H2, which correspond to different HS switch devices. As described above, each of the LED channels is independently controllable, such that the particular operation of the LS switch inputs can vary from that shown in FIG. 4 depending on whether the input is activated in sequential phases. In the example of FIG. 4, it is assumed that LX is activated in two adjacent activation phases of a cycle for driving, in a preceding activation phase, a LED coupled with H1 and for driving a different LED coupled with H2 in a next activation phase.

In the example of FIG. 4, it is shown that as H1 is deactivated from an ON condition to an OFF condition approximately 10 μs prior to LX being deactivated to an OFF condition. Approximately 6 μs after H1 going OFF, H2 is activated to an ON condition for energizing a set of associated LED's. A blanking time interval $t_{delay}$ (e.g., $t_{delay}$=42 μs) is implemented to delay turning LX to an ON condition to enable current to flow through the corresponding LED coupled with H2 and LX. The blanking time $t_{delay}$ is incorporated into the control via the low-side switch device, such as according to the synchronization of the LS and HS switch devices (e.g., provided by the internal oscillator). By employing the blanking time interval $t_{delay}$ diode capacitance discharge of other LED's in the system can be mitigated. This further reduces undesirable interference that might result from overlapping activation of LED sets 55, 56, 58 (FIG. 2), which overlapping can cause dimming if were to draw too much current. Those skilled in the art will understand and appreciate that the example time periods shown and described with respect to FIG. 4 are provided only for clarity of explanation, as any suitable timing relationships can be employed based on the teachings herein.

Figure 5:
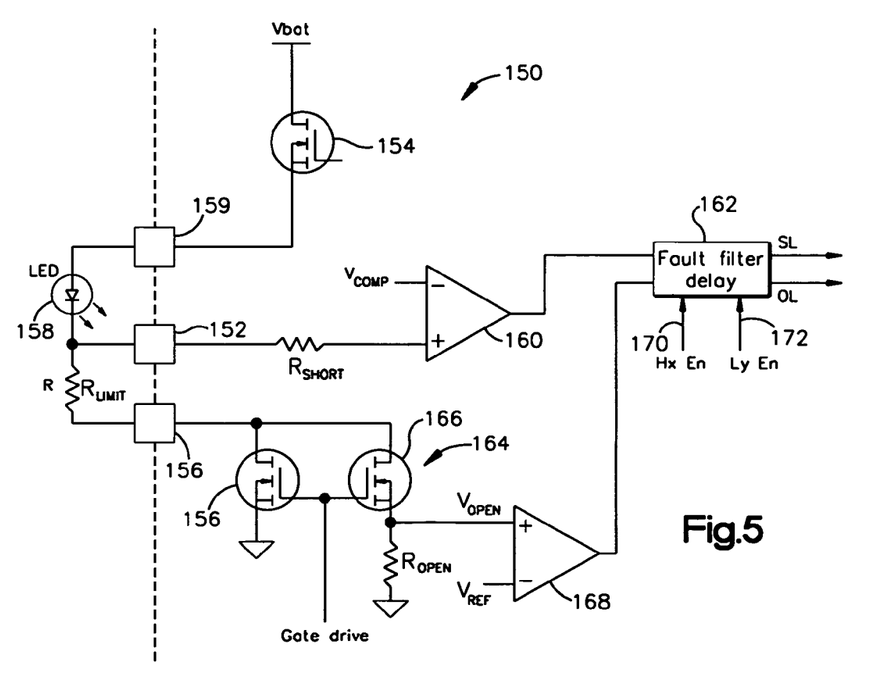
FIG. 5 is an example of a circuit diagram of a fault monitoring system that can be implemented in a driver system in accordance with an aspect of the present invention.

FIG. 5 depicts an example of a fault monitoring system 150 that can be implemented to provide for diagnostic functions in connection with the driver system. It will be appreciated that the system 150 can be coupled (internally or externally) to monitor fault conditions with any number of one or more output channels being controlled by a driver system according to an aspect of the present invention.

The fault monitoring system 150 includes a diagnostic input node 152, such as may correspond to inputs 92–96 of FIG. 2. The node 152 is coupled at an output of one or more associated LED 158 for detecting a short-to-ground fault condition. The LED 158 is coupled between a HS output 159 and the diagnostic input 152 The fault monitoring system 150 is operative to monitor fault conditions when both a high-side switch device 154 and corresponding low-side switch devices 156 are enabled for driving one or more LED's 158 coupled between the enabled high-side and low-side switch devices. The diagnostic input node 152 thus monitors the voltage at the node between the LED 158 and associated current limiting resistor RLIMIT. The voltage signal at input 152 is provided to a non-inverting input of a comparator 160. The comparator 160 compares the input voltage monitored at the node 152 relative to a comparison voltage $V_{COMP}$. For example, the comparison voltage $V_{COMP}$ can correspond to the difference between the $V_{BAT}$ and the comparison voltage ($V_{COMP}$=$V_{BAT}$–threshold). The comparator 160 provides a corresponding output to a fault filter delay block 162.

The diagnostic node 152 can be monitored, for example, for a voltage that is at least one volt to ensure that the load, namely the LED 158, is connected properly to the limiting resistor $R_{LIMIT}$. During normal operation, the node 152 is equal to approximately $V_{BAT}$–5V. Additionally, if the load 158 is shorted, the voltage at the diagnostic input node 152 will approximate $V_{BAT}$, such that the output of the comparator 160 will change states. In response to the comparator output changing states, the fault filter delay element 162 provides a corresponding shorted load output (SL). The SL output can be employed to set a corresponding SL register value of the associated driver system. The SL register value can be provided as a fault output status to a corresponding microcontroller, such as described herein.

The fault monitoring system 150 also is operative to monitor one or more channels for an open load condition. In this regard, the gate of the low-side switch device 156 (e.g., Q4–Q6) is coupled to corresponding open load detection circuitry 164. The open load detection circuitry 164 includes a switch device (e.g., a MOSFET) 166 that is coupled in parallel with the corresponding low-side switch device 156. The gates of the switch devices 156 and 166 are coupled together, with the device 166 being coupled in series with a resistor ($R_{OPEN}$) between the low-side input terminal 167 and ground.

A corresponding voltage $V_{OPEN}$, corresponding to voltage across $R_{OPEN}$, is provided to an input of a comparator 168. The comparator 168 compares $V_{OPEN}$ to a reference voltage $V_{ref}$ to ascertain if there is an interruption in the load current, such as due to an open circuit condition associated with the LED 158. Thus, if the $V_{OPEN}$ falls below the $V_{ref}$ threshold, the output of the comparator 168 changes states. The comparator 168 provides a corresponding output signal to the fault delay element 162, indicating whether the comparator has detected an open condition associated with the LED 158. The fault filter delay element 162 provides a corresponding open load output signal (OL) to set a corresponding OL register value of the associated driver system. The OL register value can be provided as a fault output status to a corresponding microcontroller, such as described herein.

The fault filter delay element 162 can filter the respective signals from the comparators 160 and 168 to mitigate erroneous reporting, such as may be due to prolonged switching times and fast transients. Accordingly, the fault filter delay element 162 is enabled for implementing corresponding diagnostic functions based on the high-side enable (Hx En) and low-side enable (Ly En) signals 170 and 172 that are provided to the fault filter delay element 162 for the respective channel(s) being monitored. The monitoring system 150 thus can report fault conditions provided that the appropriate high and low-side switches were enabled for the particular channel(s) being monitored. Those skilled in the art will understand various other fault monitoring diagnostics that can be implemented in conjunction with a driver system implemented in conjunction with a driver system implemented according to an aspect of the present invention. The value of the status registers can be employed to provide diagnostic status information to a corresponding microcontroller or other circuitry for implementing appropriate fault protection measures.

Figure 6:
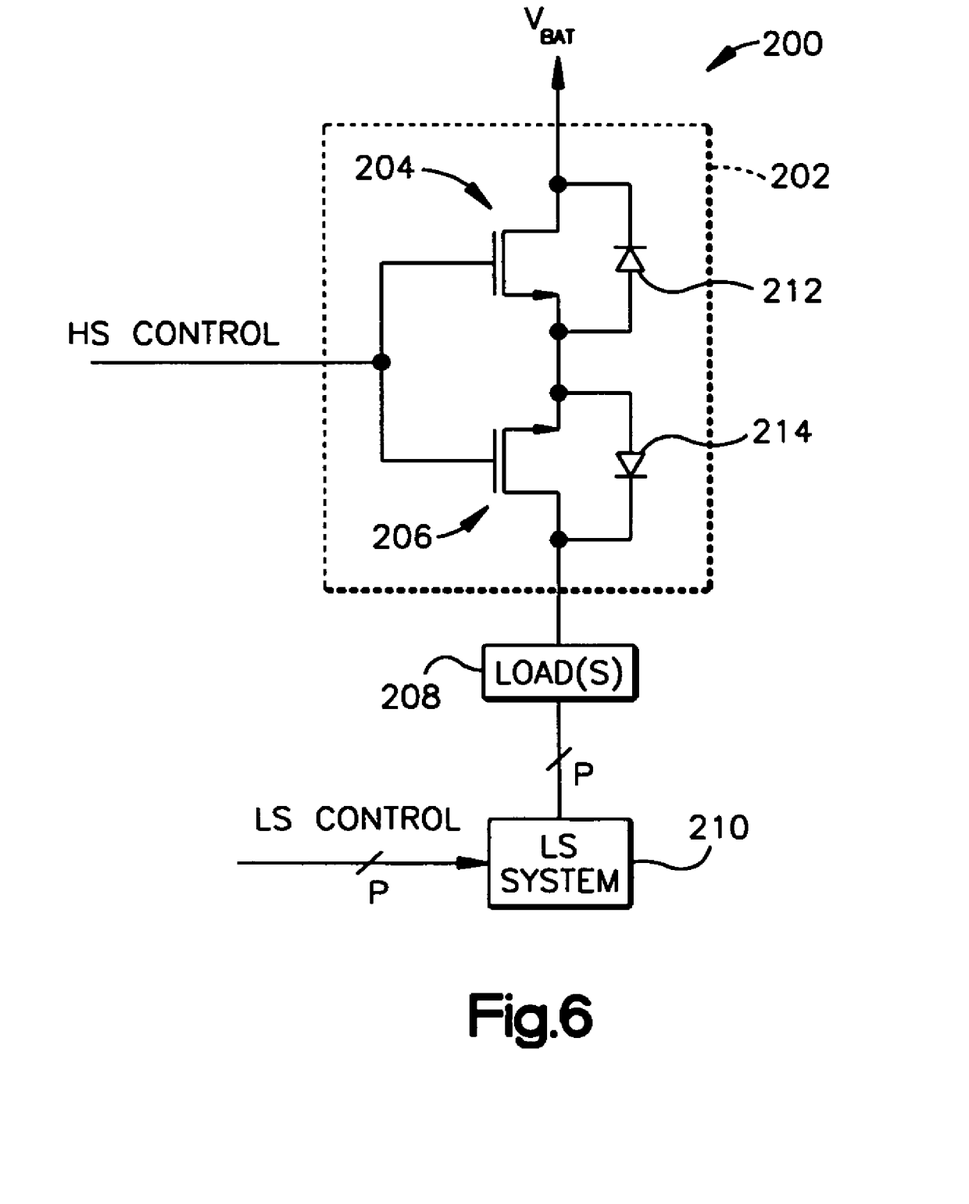
FIG. 6 is an example of a circuit diagram for implementing high-side switching with reverse battery protection according to an aspect of the present invention.

FIG. 6 depicts an example of a circuit diagram of part of a driver system 200 operative to provide reverse battery protection according to an aspect of the present invention. The system 200 includes a HS switch device 202 configured to provide reverse battery protection (e.g., to protect the system in the event polarity were reversed for the supply voltage $V_{BAT}$). The switch device 202 includes a pair of MOSFET devices 204 and 206 having their gates connected together for receiving a HS control signal. The HS control signal can be provided from a HS gate control (e.g., driver), such as described herein. The MOSFET devices 204 and 206 are arranged in parallel with their respective sources coupled together. The drain of MOSFET 204 is connected to $V_{BAT}$ and the drain of MOSFET 206 is coupled to one or more loads 208. The one or more loads 208 can be selectively energized with current based on activation of a LS system 210. The LS system 210 is controlled based on one or more LS control signals (e.g., from a LS driver or control system) that determine current through each of one or more (P) channels that comprise the loads 208. The LS system 210, for example, can be controlled via PWM and/or current control, such as described herein, to provide desired current through each of the P channels.

Each of the MOSFETs 204 and 206 also includes a parasitic diode explicitly shown at 212 and 214, respectively. As a result of the configuration of MOSFETs 204 and 206, the HS device 202 can source current to the load through the MOSFETs if the control signal activates the MOSFETs and $V_{BAT}$ is positive. If $V_{BAT}$ were to reverse polarity, such as might occur by improperly connecting leads of an automobile battery or other source of $V_{BAT}$, current would not conduct through the HS device 202. The non-conductive state of the HS device 202 is provided due to the MOSFET 206 and its associated diode not being biased to a conductive state when $V_{BAT}$ is negative, regardless of whether the HS control is activated high. Those skilled in the art may understand and appreciate other configurations and protection schemes that may be employed to provide for suitable reverse battery protection in the driver system 200, all of which are contemplated as falling within the scope of the appended claims.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for controlling a plurality of load devices, comprising:
a high-side system operative to source current relative to at least two associated outputs;
a low-side system operative to sink current relative to a plurality of associated inputs; and
a control system that controls the high-side system and the low-side system according to a multiplexing scheme that is operative to provide current to selected load devices of the plurality of load devices connected between the associated outputs and the associated inputs, wherein the high-side system further comprises at least two switch devices, the control system implements the multiplexing scheme to operate the at least two switch devices of the high-side system in a sequence for providing substantially regulated average current to the selected load devices during each cycle.

2. The system of claim 1, wherein the control system implements the multiplexing scheme based on a number of the switch devices of the high-side system being operated each cycle.

3. The system of claim 1, wherein the low-side system further comprises a plurality of low-side switch devices, the control system operates selected low-side switch devices of the low-side system commensurate with corresponding operation of a given one of the switch devices of the high-side switching system for each of a plurality of activation phases in each cycle to control the substantially regulated average current being sinked at each of the associated inputs for the selected low-side switch devices.

4. The system of claim 1, wherein the control system operates selected low-side switch devices of the low-side system using at least one of a variable pulse width and a variable current control for controlling operation of the selected low-side switch devices to sink a substantially regulated average current relative to the inputs associated with the selected low-side switch devices during each cycle.

5. The system of claim 1, wherein
the low-side system further comprises a plurality of low-side switch devices, the control system controlling the duty cycle and sequence for operating the high-side switch devices and the low-side switch devices according to the multiplexing scheme to provide substantially regulated average current to each of the plurality of loads during each cycle.

6. The system of claim 5, wherein the duty cycle is functionally related to the number of the high-side switch devices being operated by the control system each cycle.

7. The system of claim 5, wherein the high-side switch devices comprise M switch devices, where M is a positive integer greater than or equal to two denoting the number of high-side switch devices, and the low-side switch devices comprises N switch devices, where N is a is a positive integer greater than or equal to one denoting the number of low-side switch devices, and where N is different from M.

8. The system of claim 7, wherein M*N defines a maximum number of the plurality of load devices capable of being independently driven by the system.

9. The system of claim 1, further comprising a fault monitoring system operative to detect a protection condition associated with at least one of the low-side system, the high-side system and at least some of the plurality of load devices.

10. The system of claim 9, further comprising a protection for implementing protection of at least one of the high-side system, the low-side system and the plurality of load devices in response to the fault monitoring system detecting a protection condition.

11. An integrated circuit comprising the system of claim 1.

12. A system for controlling a plurality of load devices, comprising:
a high-side system operative to source current relative to at least two associated outputs;
a low-side system operative to sink current relative to a plurality of associated inputs, a control system that controls the high-side system and the low-side system according to a multiplexing scheme that is operative to provide current to selected load devices of the plurality of load devices connected between the associated outputs and the associated inputs, in combination with a load that comprises the plurality of load devices coupled between the associated outputs and the associated inputs, wherein;
the high-side system further comprises a plurality of high-side switch devices; and
the low-side system further comprises a plurality of low-side switch devices;
the external load comprising a plurality of light emitting diodes (LED's) arranged in at least two sets of LED's, each of the at least two sets of LED's being coupled to one of the associated outputs to be driven by a respective one of the plurality of high-side switch devices, the LED's in each of the at least two sets of LED's being coupled for sinking current by an associated one of a plurality of low-side switch devices of the low-side system; and
the control system controlling the high-side switch devices and the low-side switch devices according to the multiplexing scheme to provide substantially regulated average current for selectively operating the plurality of LED's.

13. The combination of claim 12, wherein the control system controls a duty cycle and sequence of the high-side and low-side switch devices to selectively operate the plurality of LED's at a switching frequency that is less than about 500 Hz.

14. The combination of claim 12, further comprising a current limiting resistance coupled between each of the low-side switch devices and the LED's in at least some of the at least two sets of diodes.

15. The combination of claim 12, wherein each of the high-side switch devices and the low-side switch devices comprises at least one transistor.

16. A light emitting diode system, comprising:
a driver system comprising:
a set of high-side switch devices;
a set of low-side switch devices;
a control system that controls operation of selected switch devices in the set of high-side switch devices and the set of low-side switch devices each cycle according to a multiplexing scheme; and
a plurality of light emitting diodes (LED's) arranged in at least two sets of LED's, each of at least two of the high-side switch devices being coupled to drive LED's in an associated one of the at least two sets of the LED's, the low-side switch devices being coupled to sink current from the LED's in each of the at least two sets of LED's, a selected subset of at least some of the LED's being selectively operated for illumination at a switching frequency based on operation of the selected switch devices by the control system.

17. The system of claim 16, further comprising a current limiting resistance coupled between each of the low-side switch devices and corresponding LED's in at least some of the at least two sets of LED's.

18. The system of claim 16, wherein the control system controls the high-side switch devices and the low-side switch devices to selectively operate the selected subset of the LED's at a switching frequency that is less than about 500 Hz, such that substantially regulated average current is provided to the selected subset of the LED's during each cycle.

19. The system of claim 16, wherein the multiplexing scheme varies based on a number of the high-side switch devices being operated by the control system during each cycle.

20. The system of claim 16, wherein the control system controls selected low-side switch devices during each of a plurality of activation phases in each cycle relative to corresponding operation of a given one of the high-side switch devices to substantially regulate an average current through the LED's.

21. The system of claim 20, wherein the control system operates the selected low-side switch devices with a variable pulse width and blanking interval during each of a plurality of activation phases of each cycle to substantially regulate the average current through the LED's each cycle.

22. The system of claim 20, wherein each of the high-side switch devices and each of the low-side switch devices comprises at least one transistor, the control system being operative to provide a bias control signal to at least one selected low-side transistors for substantially regulating the average current through the at least one selected low-side transistors.

23. The system of claim 16, wherein the high-side switch devices comprise M switch devices, where M is a positive integer greater than or equal to two denoting the number of high-side switch devices, and the set of low-side switch devices comprises N switch devices, where N is a positive integer greater than or equal to one denoting the number of low-side switch devices, and where N is greater than M.

24. The system of claim 23, wherein the sum of M and N (M+N) is less than the number LED's and M*N defines a maximum number of the LED's in the system.

25. The system of claim 16, further comprising a fault detection system operative to detect a protection condition associated with at least some of LED's.

26. The system of claim 25, wherein the control system is operative to implement protection relative to at least one of the high-side switch device, the low-side switch devices and the LED's in response to the fault detection system detecting a protection condition.

27. A system for driving a plurality of light emitting diodes (LED's), comprising:

means for sourcing current to at least some of the plurality of LED's;

means for controlling the means for sourcing current according to a duty cycle;

means for sinking current from an associated one of the plurality of LED's; and means for controlling the means for sinking current relative to operation of the means for sourcing current for operating a selected subset of at least some of the plurality of LED's at a corresponding switching frequency that provides a substantially regulated average current through the LED's of the selected subset of LED's each cycle, whereby a desired intensity of illumination for the LED's of the selected subset of LED's is provided.

28. The system of claim 27, further comprising means for detecting a fault condition associated with at least a portion of the system.

29. The system of claim 27, further comprising means for implementing protection of at least some components of the system in response to detecting the fault condition.

30. The system of claim 27, further comprising means for providing a blanking time interval to delay operating the means for sinking current relative to operation of the means for sourcing current during each activation phase of each cycle.

31. The system of claim 27, further comprising resistive means for limiting current through the LED's each cycle.

32. The system of claim 27, further comprising means for programming operating parameters of the system.

* * * * *